(12) United States Patent
Ayrapetian et al.

(10) Patent No.: US 8,705,676 B2
(45) Date of Patent: Apr. 22, 2014

(54) METHOD AND APPARATUS FOR CLOCK RECOVERY IN XDSL TRANSCEIVERS

(75) Inventors: Robert Ayrapetian, Morgan Hill, CA (US); Qasem Aldrubi, Fremont, CA (US); Hossein Dehghan-Fard, Danville, CA (US); Christopher Chow, Redwood City, CA (US)

(73) Assignee: Ikanos Communications Inc., Fremont, CA (US)

( * ) Notice: Subject to any disclaimer, the term of this patent is extended or adjusted under 35 U.S.C. 154(b) by 747 days.

(21) Appl. No.: 12/802,884

(22) Filed: Jun. 15, 2010

(65) Prior Publication Data
US 2010/0316102 A1 Dec. 16, 2010

Related U.S. Application Data

(60) Provisional application No. 61/186,945, filed on Jun. 15, 2009.

(51) Int. Cl.
*H04L 7/00* (2006.01)

(52) U.S. Cl.
USPC .......... 375/355; 375/362; 375/366; 375/371; 375/373; 375/375; 375/376; 375/260; 375/267; 375/347

(58) Field of Classification Search
CPC ........... H04L 27/2662; H04L 27/2655; H04L 27/2675; H04L 27/2676
USPC ........ 375/219, 222, 324, 340, 342, 346, 355, 375/373, 376, 356, 362, 363, 364, 365, 366, 375/371, 372, 374, 375, 260, 267, 347
See application file for complete search history.

(56) References Cited

U.S. PATENT DOCUMENTS

| | | | |
|---|---|---|---|
| 6,577,690 B1 | 6/2003 | Barman | |
| 6,628,738 B1 * | 9/2003 | Peeters et al. | 375/371 |
| 7,035,326 B1 | 4/2006 | Heidari | |
| 7,076,002 B1 | 7/2006 | Ramirez-Mireles | |
| 7,469,028 B2 * | 12/2008 | Jeong | 375/355 |
| 7,539,255 B2 * | 5/2009 | Redfern | 375/260 |
| 7,577,206 B2 * | 8/2009 | Kim | 375/260 |
| 7,787,550 B2 * | 8/2010 | Lu | 375/260 |
| 8,094,768 B2 * | 1/2012 | Tan | 375/371 |
| 2001/0048667 A1 * | 12/2001 | Hamdi | 370/252 |
| 2002/0191535 A1 * | 12/2002 | Sugiyama et al. | 370/208 |
| 2009/0028252 A1 | 1/2009 | Lu | |
| 2009/0079634 A1 | 3/2009 | Rose | |

* cited by examiner

*Primary Examiner* — Sophia Vlahos
(74) *Attorney, Agent, or Firm* — Pillsbury Winthrop Shaw Pittman LLP

(57) ABSTRACT

A multi-tone transceiver including: a transform component, a tone selector, an error detector, an aggregator and an oscillator. The transform component transforms received communications from the time domain to the frequency domain. The tone selector selects a sub-set of the received tones which exhibit an elevated signal-to-noise ratio (SNR) as a clock recovery tone set (CRTS) and drops and add tones to the CRTS as required by changes in the SNR of the individual tones. The error detector detects phase errors in each received tone of the CRTS. The aggregator calculates an average aggregate phase error from all tones in the CRTS. The oscillator controls clocking of the transceiver. The oscillator is responsive to the average aggregate phase error to adjust a clock phase in a direction which reduces a phase error with a clock on the opposing transceiver.

21 Claims, 6 Drawing Sheets

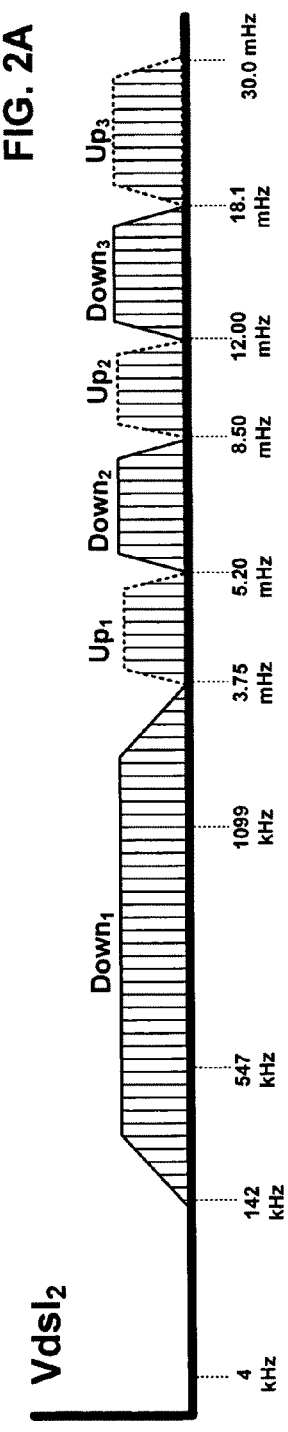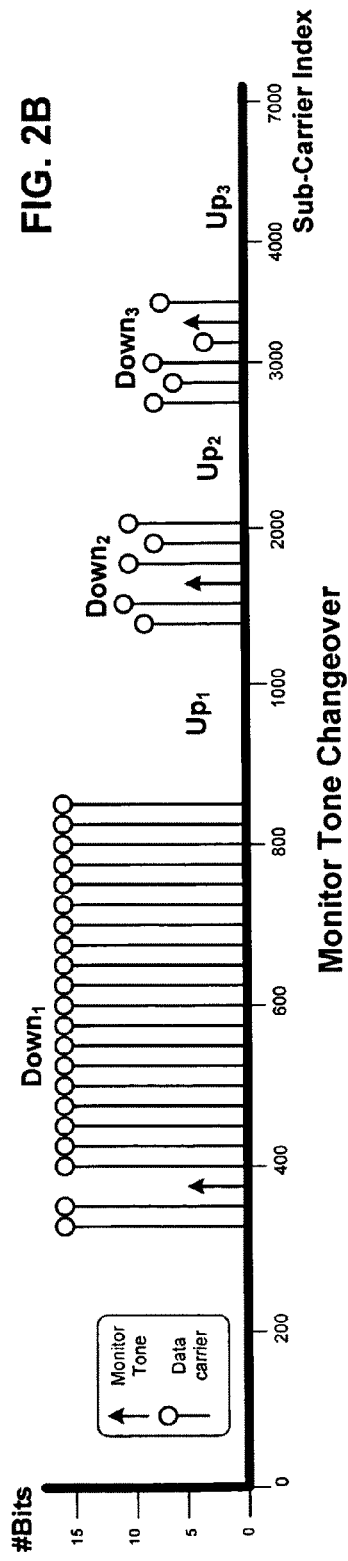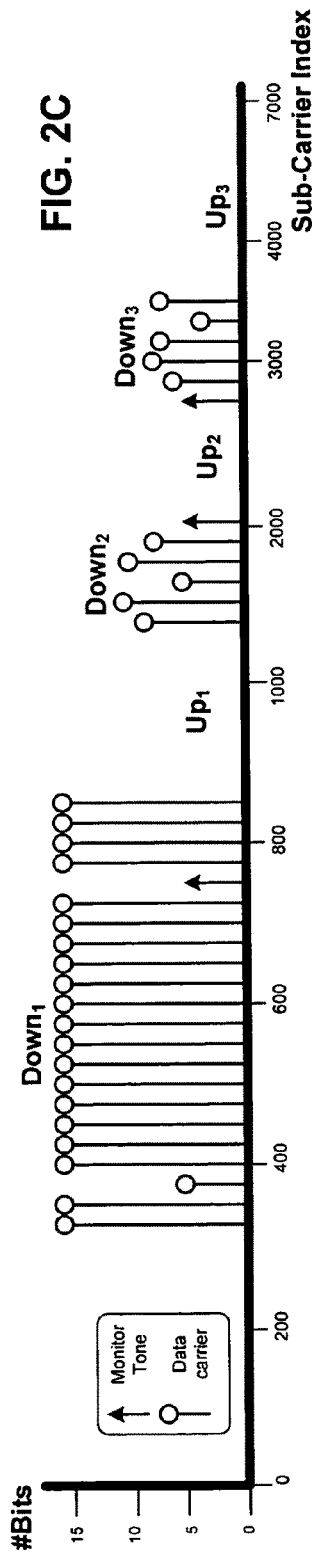

Clock Recovery using
Monitor Tones (PRBS)

Clock Recovery using
Data Tones (2 Bit)

METHOD AND APPARATUS FOR CLOCK RECOVERY IN XDSL TRANSCEIVERS

CROSS REFERENCE TO RELATED APPLICATION

This application claims the benefit of prior filed Provisional Applications No. 61/186,945 filed on Jun. 15, 2009 entitled "Method and Apparatus for Robust Data Recovery over Monitored Subcarriers" which is incorporated herein by reference in its entirety as if fully set forth herein.

BACKGROUND OF THE INVENTION

1. Field of Invention

The field of the present invention relates in general to modems and more particularly digital modems.

2. Description of the Related Art

Digital Subscriber Lines (DSL) technology and improvements thereon including: G.Lite, ADSL, VDSL, HDSL all of which are broadly identified as X-DSL have been developed to increase the effective bandwidth of existing subscriber line connections, without requiring the installation of new fiber optic cable. Subscriber lines were originally constructed to handle voice traffic in the narrow band between 300 Hz to 3000 Hz at bandwidths equivalent to several kilo baud. With X-DSL significant increases in bandwidth have been made possible by utilizing frequencies higher than the voice band to deliver services such as: data, video, audio etc. Thus an X-DSL modem may operate simultaneously with a voice band modem or a telephone conversation.

Currently there are over ten XDSL standards, including: G.Lite, ADSL, VDSL, SDSL, MDSL, RADSL, HDSL, etc. Within each standard there may be more than one line code, or modulation protocol, e.g. discrete multi-tone (DMT) and carrier less AM/PM (CAP). DMT modulation involves establishing a communication channel with a plurality of sub-channels each with a center frequency a.k.a. carrier tone. The sub-channels are frequency division multiplexed across the available bandwidth. Each sub-channel uses quadrature phase amplitude modulation (QPAM) to modulate information. The center frequency, a.k.a. tone of each sub-channel serves as the carrier on which QPAM modulation of information is effected. The information modulated on a tone is identified in the frequency domain as a sub-symbol which defines a unique phase and amplitude relationship between the carrier tone and the information modulated on it. Each sub-symbol may be expressed as a complex number. Specific bits of information are converted to a corresponding complex number using a mapping table, which defines for all possible phase and amplitudes supported by the DMT protocol corresponding binary bits. Collectively all the sub-symbols modulated on each tone across a tone set are defined as a symbol, with the symbol rate defined by the corresponding X-DSL standard.

Typically initialization of an X-DSL modem utilizing a DMT modulation protocol, begins with several discrete phases of initialization including: handshake, training and channel analysis. During initialization system clocks on opposing modems are synchronized along with symbol boundaries. This synchronization is accomplished with a fixed set of data, a.k.a. pilot tones, modulated on selected sub-channels. The pilot tones and the manner in which they are modulated are known to both sending and receiving modems. Additionally, each tone is modulated with varying amount of data in order to maximize the data carrying capability of the communication medium that links the modems. During this phase the modems pass parameters which allow each to establish a bit loading for each tone across a tone set or symbol. The outcome of initialization is a contract between the modems on communication parameters which takes into account both modem capabilities and limitations in the quality of the communication medium linking the modems.

After initialization the modems enter show time phase of operation in which high speed communication of voice, data and video takes place in the allocated upstream and downstream frequency bands over the subscriber line. During show time clock recovery typically on the customer premises equipment (CPE) is used to synchronize the high speed system clock on the CPE modem with the clock of the central office (CO) modem to which it is coupled. The CPE modem has a reference clock with approximately the same frequency as that of the CO. The CPE then phase aligns with transitions in the downstream communications from the CO using a phase-locked loop circuit (PLL). The accurate synchronization of the clocks of the CO and CPE modems is critical to the orthogonality of the sub-carriers or tones and thus to the integrity of the show time communication.

The VDSL2 standard is embodied in the International Telecommunication Union (ITU) Recommendation G.993.2 of February 2006 entitled: "*Series G: Transmission Systems and Media, Digital Systems and Networks . . . Very High Speed Digital Subscriber Line Transceivers 2 (VDSL2)*" In Section 10.4.5 of that standard entitled "Synchronization" the use of sixteen or fewer pilot tones is specified for providing the transitions required for clock recovery during initialization and show time phases of modem operation. These tones are selected by the CPE modem and remain fixed throughout show time operation. The modulation associated with a sub-carrier designated as a pilot tone is specified as 4-QAM (Quadrature Amplitude Modulation) with a fixed value of '00'.

What is needed is a modem with improved capabilities for clock recovery during show time phase of modem operation.

SUMMARY OF THE INVENTION

The present invention provides a method and apparatus for clock recovery in XDSL transceivers. This allows clock synchronization with a high degree of accuracy during show time phase of operation. The clock synchronization may be conducted between logical and or physical modems in any combination. The invention may be implemented in hardware, firmware or software.

The apparatus for clock recovery in one embodiment of the invention includes a multi-tone transceiver with a plurality of components forming a transmit path and a receive path configured to couple via a subscriber line to an opposing multi-tone transceiver for frequency division multiplexed multi-tone modulated communications therewith. The multi-tone transceiver includes: a transform component, a tone selector, an error detector, an aggregator and an oscillator. The transform component on the receive path transforms in each successive symbol interval received communications from a time domain to a frequency domain as individually modulated tones or sub-channels. The tone selector is coupled to transform component to select a sub-set of the received tones which exhibit an elevated signal-to-noise ratio (SNR) as a clock recovery tone set (CRTS) and to drop and add tones to the CRTS as required by changes in the SNR of the individual tones in the CRTS. The error detector couples to the tone selector to detect phase errors in each received tone of the CRTS. The aggregator couples to the error detector to calculate an average aggregate phase error from all tones in the CRTS. The oscillator couples to transmit and receive path components to control clocking thereof. The oscillator is responsive to the average aggregate phase error calculated by the aggregator to adjust a clock phase in a direction which reduces a phase error with a clock on the opposing transceiver. These capabilities maintain synchronous operation with the opposing multi-tone transceiver by intermittently re-selecting CRTS tones responsive to changes in SNR.

Associated methods and means are also claimed.

BRIEF DESCRIPTION OF THE DRAWINGS

These and other features and advantages of the present invention will become more apparent to those skilled in the art from the following detailed description in conjunction with the appended drawings in which:

FIG. 2A is a graph of power versus frequency for a VDSL communication spectrum showing multiple upstream and downstream band plans.

FIGS. 2B-2C are graphs of bit loading versus tone or sub-carrier index for the downstream portion of the VDSL band plan shown in FIG. 2A showing sub-carriers identified as monitor tones and data tones. (30)

DETAILED DESCRIPTION OF THE EMBODIMENTS

A method and apparatus for clock recovery in XDSL transceivers is disclosed which allows clock synchronization with a high degree of accuracy during show time phase of operation. The clock synchronization may be conducted between logical and or physical modems in any combination. The invention may be implemented in hardware, firmware or software. The modems, a.k.a. line cards may be found in a central office, remote access terminal, business or home. The modems may be coupled directly or indirectly to digital subscriber lines via one or more optical or wireless links. The line cards support communication channels with differing degrees of robustness for multi-tone protocols including: asymmetric digital subscriber line (ADSL); very high bit rate digital subscriber line (VDSL) and other orthogonal frequency division multiplexing (OFDM) band plans including but not limited to the following:

TABLE 1

| Standard name | Common name | Downstream rate | Upstream rate |
|---|---|---|---|
| ANSI T1.413-1998 Issue 2 | ADSL | 8 Mbit/s | 1.0 Mbit/s |
| ITU G.992.1 | ADSL (G.DMT) | 8 Mbit/s | 1.0 Mbit/s |

TABLE 1-continued

| Standard name | Common name | Downstream rate | Upstream rate |
|---|---|---|---|
| ITU G.992.1 Annex A | ADSL over POTS | 8 Mbit/s | 1.0 MBit/s |
| ITU G.992.1 Annex B | ADSL over ISDN | 8 Mbit/s | 1.0 MBit/s |
| ITU G.992.2 | ADSL Lite (G.Lite) | 1.5 Mbit/s | 0.5 Mbit/s |
| ITU G.992.3/4 | ADSL2 | 12 Mbit/s | 1.0 Mbit/s |
| ITU G.992.3/4 Annex J | ADSL2 | 12 Mbit/s | 3.5 Mbit/s |
| ITU G.992.3/4 Annex L | RE-ADSL2 | 5 Mbit/s | 0.8 Mbit/s |
| ITU G.992.5 | ADSL2+ | 24 Mbit/s | 1.0 Mbit/s |
| ITU G.992.5 Annex L[1] | RE-ADSL2+ | 24 Mbit/s | 1.0 Mbit/s |
| ITU G.992.5 Annex M | ADSL2 + M | 24 Mbit/s | 3.5 Mbit/s |
| ITU G.993.1 | VDSL | | |
| ITU G.993.2 | VDSL 2 | | |

Figure 1:
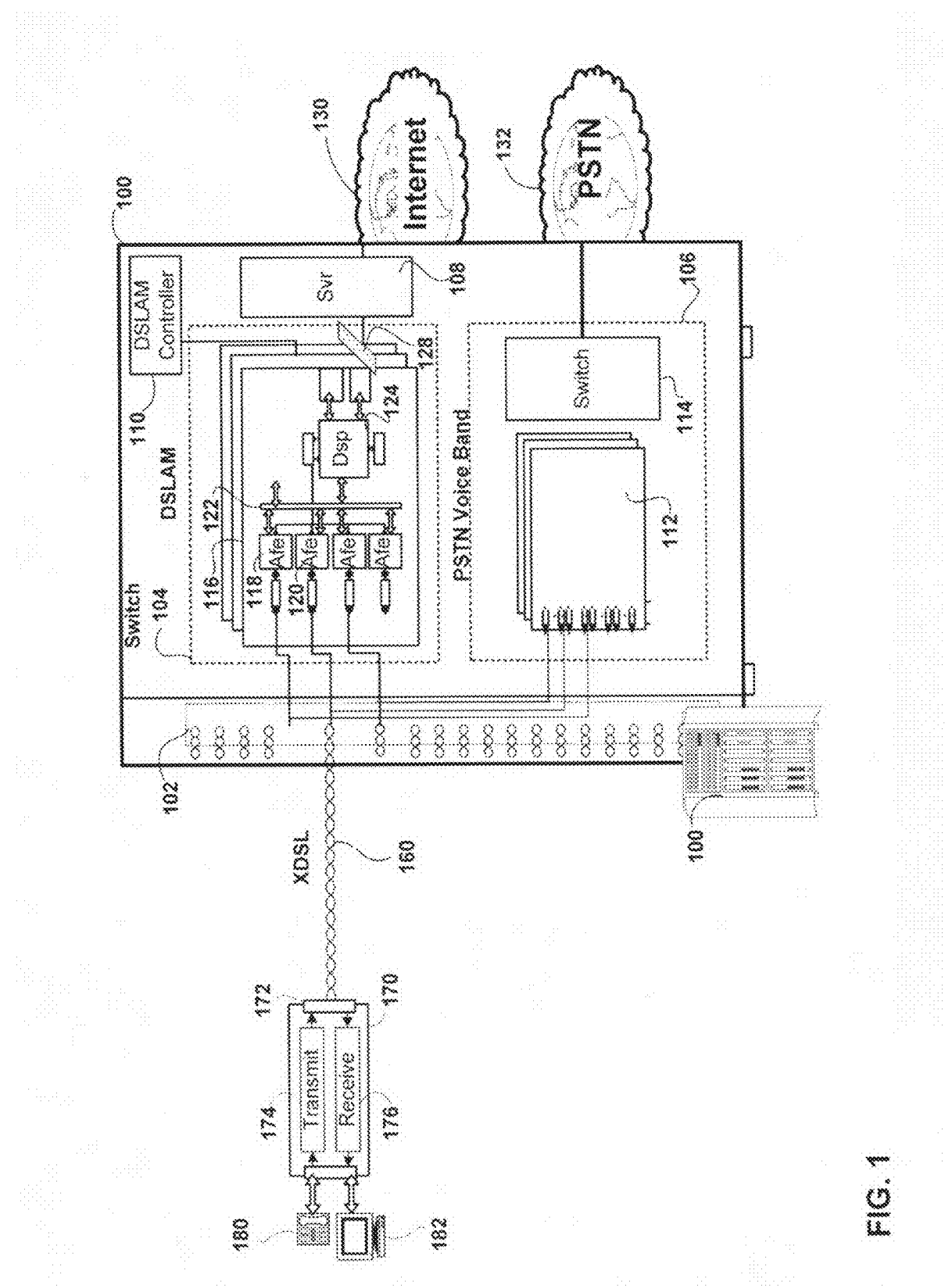
FIG. 1 shows a communication system with a logical modem at a central office (CO) coupled over a subscriber line to a physical modem at a customer's premises.

FIG. 1 shows a communication system with a logical modem at a central office (CO) coupled over a subscriber line 160 to a physical modem 170 at a customer's premises (CPE). All subscriber lines handled by the CO originate in the frame room 102 of the CO. From this room connections are made for each subscriber line via splitters and hybrids to both a digital subscriber line access module (DSLAM) 104 and to the voice band racks 106. The splitter 102 shunts voice band communications to dedicated line cards, e.g. line card 112 or to a voice band modem pool (not shown). The splitter shunts higher frequency X-DSL communications on the subscriber line to a selected line card, e.g. line card 116, within DSLAM 104. Voice band call set up is controlled by a Telco switch matrix 114 such as SS7. This makes point-to-point connections to other subscribers for voice band communications across the public switched telephone network 132. The X-DSL communications may be processed by a universal line card such as line card 116. That line card implements a plurality of logical modems via a digital signal processor (DSP) 124 coupled across a packet bus 122 with a number of analog front ends (AFE) of which AFEs 1180120 are referenced. Each AFE couples via a hybrid front end (HFE) with a corresponding one of the subscriber lines. For downstream communications from the CO to the remote site, the DSP modulates the data for each communication channel, the AFE transforms the digital symbol packets assembled by the DSP and converts them to an analog signal which is output on the subscriber line associated with the respective channel. For upstream communications from the remote site to the CO the AFE converts the communications to digitized data samples which are sent to the DSP where they are demodulated. The DSP may be capable of multi-protocol support for all subscriber lines to which the AFE's are coupled. Communication between AFE(s) and DSP(s) may be packet based. The line card 116 is coupled via a back-plane bus 128 to the Internet 130 via server 108. Each of the DSLAM line cards operates under the control of a DSLAM controller 110 which handles global provisioning, e.g. allocation of subscriber lines to AFE and DSP resources. The various components on the line card form a plurality of logical modems each handling upstream and downstream communications across corresponding subscriber lines. When an X-DSL communication is established on a subscriber line, a specific channel identifier is allocated to that communication. That identifier may be used in the above mentioned packet based embodiment to track each packet as it moves in an upstream or downstream direction between the AFE and DSP.

At the customer premises a physical modem 160 is shown coupled via HFE 172 to subscriber line 160. That physical modem has shared and discrete components forming a transmit path 174 and a receive path 176. The physical modem couples voice band communications with the phone 180 and X-DSL band communications with the computer terminal 182. The physical modem 170 initiates clock recovery processes during show time which allow the physical modem to maintain a synchronous clock with the master clock on the logical modem at the CO. The process is accomplished without requiring any change in the processes or architecture of the logical modem on the CO.

FIG. 2A is a graph of power versus frequency for a VDSL communication spectrum showing multiple upstream and downstream band plans.

FIGS. 2B-2C are graphs of bit loading versus tone or sub-carrier index for the downstream portion of the VDSL band plan shown in FIG. 2A during show time operation of the modem. Each tone is identified by an associated tone index, a.k.a. bin number. Sub-carriers designated as monitor tones are shown with an arrow while those designated for transport of one or more bits of user data are shown with circles. In FIG. 2C a different set of tones has been selected to serve as clock recovery tones.

The basis for clock recovery in accordance with the current invention will now be set forth.

Single Tone

PPM is a relative clock frequency error between central office (CO) and customer premises equipment (CPE) as expressed in the following Equation 1:

$$PPM = \frac{f_{co}}{f_{cpe}} - 1$$

If, for example, the nominal frequency of the clock on the opposing XDSL modems is 35.328 MHz, then 1 PPM frequency error corresponds to 35.328 Hz.

The phase error in radians on a single tone having an index k for a single symbol interval is shown in the following Equation 2:

$$\measuredangle_k \approx 2\pi k \, PPM$$

where phase error increases linearly with frequency.

The phase noise for a tone k is equivalent to the phase error for the tone. The statistical variance of that phase noise or phase error for a tone k in each of N successive symbol intervals, e.g. N=64 or N=128 symbols is $\sigma_{z_k}$.

There are inaccuracies in using a single tone for clock recovery. Specifically, intermittent or static noise in the associated frequency range renders phase error determinations less reliable.

Multiple Tones

In an embodiment of the invention multiple tones are aggregated to calculate a phase error. The selected tones exhibit relatively high signal to noise ratios (SNR) and are distributed throughout the downstream frequency spectrum. Thus, in the case of a VDSL band plan with more than one downstream band, the selected tones for the clock recovery tone set (CRTS) are preferably distributed across each of the bands.

Furthermore, to improve the accuracy of the aggregate phase error determination each tone is assigned a weighting factor. The weighting factor for a tone is based on the insight that the accuracy of the aggregate phase error determination for a selected tone is inversely proportional to the statistical variance in the phase error of the selected tone. In other words an aggregate phase error determination from a tone with a standard Gaussian/normal distribution of 1 is a more accurate predictor of composite aggregate phase error than the aggregate phase error from another tone with a statistical variance greater than Gaussian and a correspondingly flatter and less peaked distribution.

The weighting factor, alpha ($\alpha$) for the average phase error of a given tone is inversely proportional to the noise on the tone as indicated in the following Equation 4a:

$$\alpha_k = \frac{1}{\sigma_{L_k}}$$

The average aggregate weighted phase error for all tones in the set used for clock recovery is the average of the weighted sum of the average phase errors for each tone in the set in each successive symbol interval as shown in the following Equation 5:

$$L_{kSetWAv} = \frac{\sum_M \alpha_k L_k}{M}$$

where M is the number of tones in the set. The weighting factor alpha for each tone is constant for the N successive symbol intervals over which the phase error on the tone is measured.

Reselection of Clock Recovery Tones

When the signal to noise ratio (SNR) on one or more tones in the set utilized for clock recovery decreases below a threshold level the tone(s) can no longer reliably be used for clock recovery. In an embodiment of the invention new tone(s) are selected for the CRTS. These new tones exhibit relatively high SNR levels. Additionally, the selected tones of the new CRTS are distributed spectrally across the one or more downstream bands of the associated XDSL band plan standard so as to provide accurate characterization of phase error across the communication spectrum.

The selection of new tones requires an estimate of the weighting factor(s) alpha assigned to each new tone. If these initial weighting factors are not closely correlated with the actual weighting factors required for a smooth changeover it is possible to lose the system clock, thereby requiring reinitialization of the communication channel with the resultant service interruption. To avoid this possibility an accurate initial weighting factor for the new tone(s) in the clock recovery set is required.

The weighting factor alpha for the average phase error on a tone is inversely proportional to the variance of the phase noise or error as shown in the following Equation 4b:

$$\alpha_k = \frac{1}{\sigma_{L_k}}$$

At the time a new tone is chosen the statistical variance of the CO and CPE clocks represented by the sigma term in Equation 4b are not known. Therefore a substitution is made based on the observation that the statistical variance in clock frequencies on a tone correlates inversely with the square root of the SNR on the tone as shown in the following Equation 6a:

$$\sigma_{L_k} = \frac{1}{\sqrt{SNR}}$$

Since SNR is constantly measured for all tones across the band plan we can use the knowledge of the SNR for the newly selected tone(s) to express the initial weighting factors alpha for each new tone in the clock recovery set in terms of SNR rather than statistical variance of CO and CPE clocks as shown in the following Equation 4c:

$$\alpha_k = \sqrt{SNR_k}$$

The average aggregate weighted phase error for the newly selected clock recovery tone set is initially determined using weighting factors determined using the associated SNR of each tone in the set.

FIGS. 3A-3D are graphs showing phase errors associated with communication of a data tone encoded with 2 bits of user data or a monitor tone encoded with a pseudo-random sequence known both to sending and receiving modem. In an embodiment of the invention either or both data or monitor tones can be selected as part of the CRTS. In a preferred embodiment of the invention the CRTS is composed exclusively of monitor tones for which there is no possibility of phase error ambiguity resulting from the use of same for clock recovery since the pseudo-random bit sequence used to modulate same during show time is known to both sending and receiving modems.

Figure 3C:
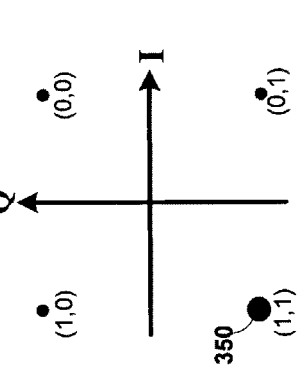
FIGS. 3A-3D are graphs showing phase errors associated with communication of a data tone encoded with 2 bits of user data or a monitor tone encoded with a pseudo-random sequence known both to sending and receiving modem.
Figure 3D:
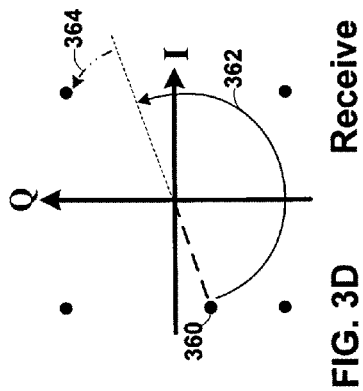
Figure 3A:
Figure 3B:
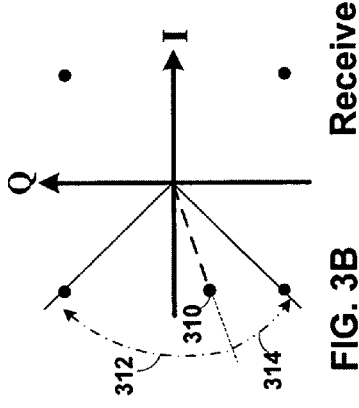

FIG. 3A-3B are transmit and receive graphs of a two bit constellation in which the data modulated on the selected tone corresponds to binary '11'. Due to noise on the line there is a phase error of sufficient magnitude to displace the phase and amplitude of the received signal to coordinates referenced as 310. Since the user data is not known to the receiving modem there is ambiguity in the direction of phase error, i.e. clockwise 312 to constellation point binary '10' or counterclockwise 314 to constellation point binary '11'. This ambiguity could in the extreme result in a loss of clock synchronization between opposing modems.

FIG. 3C-3D are transmit and receive graphs of a two bit constellation in which the pseudo random bit sequence modulated on the selected tone corresponds to binary '11'. Due to noise on the line there is a phase error of sufficient magnitude to displace the phase and amplitude of the received signal to coordinates referenced as 360. In this instance, the use of a monitor tone, with a known pseudo-random bit sequence modulated thereon removes any ambiguity in phase error after the known sequence is combined 362 with the received signal 360 the phase error 364 is unambiguously determined. Thus the use of monitor tones for the tone sets associated with clock recovery is preferred.

Monitoring tones as specified by the VDSL2 standard are former data tones taken out of service transporting user data due to unacceptably low SNR levels, e.g. less than 13 dB. They are reserved for future service when and if noise conditions change and the SNR on the tone improves. Monitoring tones carry no user data, rather a pseudo random bit sequence known to both modems. In an embodiment of the invention the data tones with the best SNR are candidates for inclusion in the clock recovery tone set, and if selected a signal is sent to the CO from the remote modem to convert them to monitor tones thereby further improving their utility for clock recovery due to the fact that the sequence modulated thereon will become a pseudo random bit sequence (PRBS) known to both sending and receiving modems.

Figure 4:
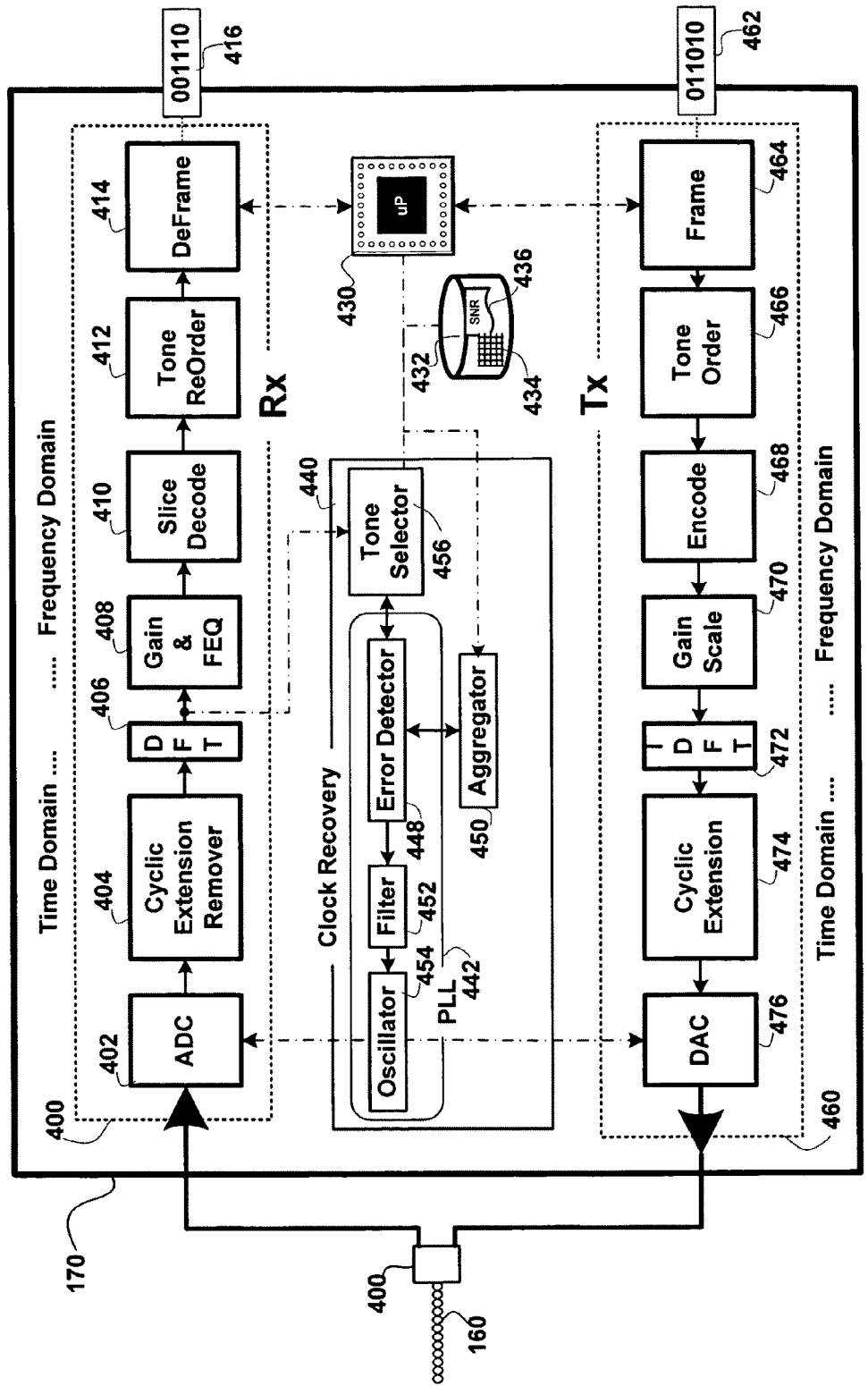
FIG. 4 is a hardware block diagram of an embodiment of the transceiver 170 shown in FIG. 1

FIG. 4 is a hardware block diagram of an embodiment of the transceiver 170 shown in FIG. 1. Transceiver 170 includes shared and discrete components coupled to one another to form a transmit path 460 and a receive path 400. The transmit and receive paths couple via a hybrid front end 400 to subscriber line 160. The transmit and receive paths include digital and analog portions for modulation and demodulation of data.

During show time the transmit path 460 accepts a digital stream 462 as input and passes that stream through successive modulation stages. In the framer 464 the data is parsed into predefined packets of bits, with the number of bits determined by the bandwidth of the communication medium established during modem initialization. In the tone orderer 466 the bits are allocated across the tone bins associated with each of the DMT tones or sub-channels. The specific number of bits per tone is established during the initialization of the modem. Next in the encoder 468 the bits for each tone are converted to a complex number or sub-symbol which defines the phase and amplitude relationship with which to modulate each sub-channels carrier tone. Then after gain scaling in the gain scaler 470 all of the sub-symbols a.k.a. tones are converted from the frequency domain to the time domain. This is accomplished in the Inverse Discrete Fourier Transform (IDFT) engine 472. Next in module 474 the cyclic extension, windowing and window overlap is applied to the digitized symbol output by the IDFT. Next the transmitted communication channel is converted from digital to analog in the digital-to-analog converter (DAC) 476 which is part of the analog portion of the transmit path. The analog portion may also include an interpolator and digital or analog filters, in alternate embodiments of the invention.

The receive path 400 also includes analog and digital portions for demodulation of data. During show time the receive path accepts modulated data from subscriber line 160 and digitizes the received data in the analog-to-digital converter 402 which is part of the analog portion of the receive path. The analog portion may also include digital or analog filters and a decimator, in alternate embodiments of the invention. The digitized data is passed to the cyclic extension removal module 404. Portions of both a cyclic prefix and suffix are removed in the cyclic prefix removal module/component.

Next in the Discrete Fourier Transform (DFT) engine each tone in the time domain is converted to a corresponding tone a.k.a. sub-symbol in the frequency domain. Each sub-symbol may be represented mathematically as a complex number expressing the phase and amplitude relationship between the carrier tone and the pilot or message data modulated thereon. Collectively each set of sub-symbols/tones make up a symbol. Next the appropriate gain scaling and frequency equalization (FEQ) is performed in the gain FEQ module 408. Subsequently, each sub-symbol is decoded to a corresponding binary sequence in the slicer and decoder 410. The resultant bits associated with each tone are then re-ordered into the initially transmitted sequence via the tone re-orderer 412 and de-framed in de-framer 414. The resultant demodulated digital data stream 416 is output from the de-framer.

The core processor 430 is shown coupled to the transmit and receive path components as well as to the memory 432 and the clock recovery module 440. Memory 432 stores setup data and initialization data 434, e.g. gain tables, equalization parameters, PSD parameters etc. determined during the initialization of a pair of modems across a given communication medium, e.g. subscriber line 160. Additionally the memory includes detailed data 436 cumulated during operation such as the signal-to-noise (SNR) ratio on each received tone.

The clock recovery module employs an oscillator which serves as a system clock to drive all components on the transmit and receive path including the DAC and the ADC. During show time clock recovery is required to maintain the synchronization between the clock on the remote modem and the master clock on the CO modem. This is accomplished by the clock recovery unit. The clock recovery module includes a phase locked loop (PLL) 442, a tone selector 456 and an aggregator 450. The phase locked loop includes an error detector 448, a low pass filter 452 and the oscillator 454. The tone selector coupled to the output of the DFT 406 to select a sub-set of the received tones which exhibit an elevated signal-to-noise ratio (SNR) as a clock recovery tone set (CRTS) and to drop and add tones to the CRTS as required by changes in the SNR of the individual tones in the CRTS. The error detector couples to the tone selector to detect phase errors in each received tone of the CRTS. The aggregator couples to the error detector to calculate an average aggregate phase error from all tones in the CRTS. The oscillator couples to transmit and receive path components to control clocking thereof. The oscillator is responsive to the average aggregate phase error calculated by the aggregator to adjust a clock phase in a direction which reduces a phase error with a clock on the opposing transceiver. The tone selector continuously re-evaluates all the SNR of all tones in the current CRTS and drops and adds tones as required to maintain the integrity of all tones within the CRTS, thus assuring highly accurate clock recovery even in the presence of changes in static or burst noise on the subscriber line.

Figure 5:
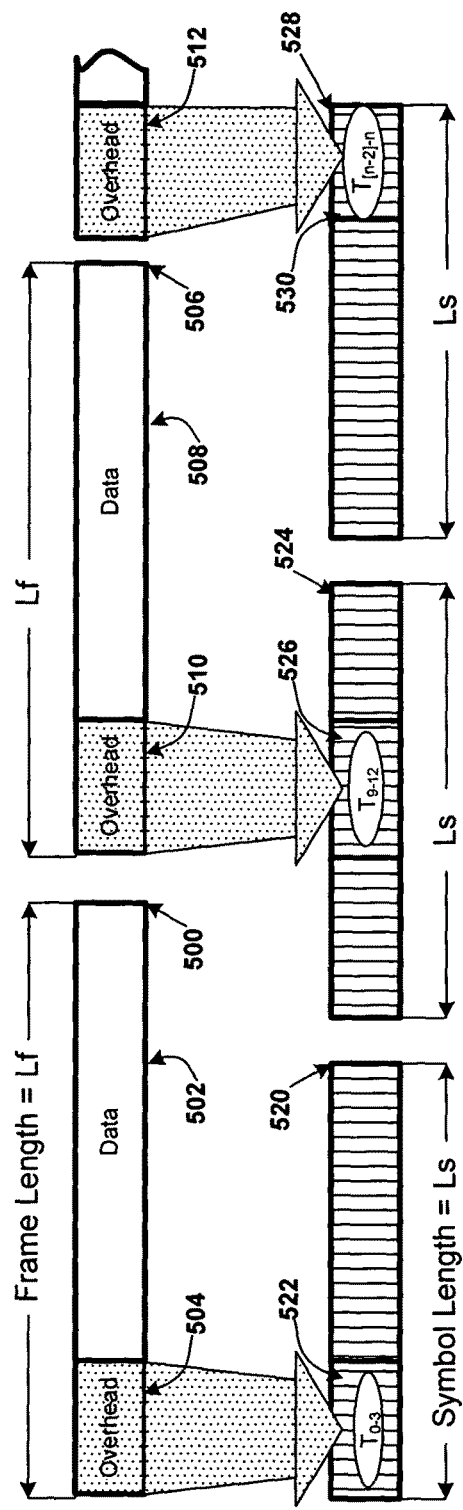
FIG. 5 is a communication and data structure diagram showing an approach to loading operational control information and communication data into each sub-channel or tone of a multi-tone symbol or tone set.

FIG. 5 is a communication and data structure diagram showing an approach to loading operational control information and communication data into each sub-channel or tone of a multi-tone symbol or tone set. A succession of frames e.g. 500 and 506 are shown each with an associated data portion, e.g. 502 and 508, as well as an associated overhead portion 504, 510, and 512. The overhead portion contains an embedded operations channel (EOC) used for passing modem control information during training and show time. The data portion contains user data, e.g. audio, video or text. The length of each frame $L_f$ is uniform and typically not equal to the length of each symbol $L_s$ or tone-set. Successive symbols 520, 524 and 528 are shown. As a result of the disparity in length between frames and symbols, the overhead data appears on different tones 522, 526 and 530 in the successive symbols, 520, 524, and 528 respectively. Control information is thus transported with the same noise immunity as the rest of the data. This channel is used in an embodiment of the invention to signal the CO modem for a change in bit assignments and or the changes in tone type associated therewith. In the VDSL standard for example tones can be flipped between monitor type with pseudo random data modulated thereon and data type with one or more bits of user data modulated thereon based on the bit assignment called for by the control message from the remote to the CO modem.

Figure 6:
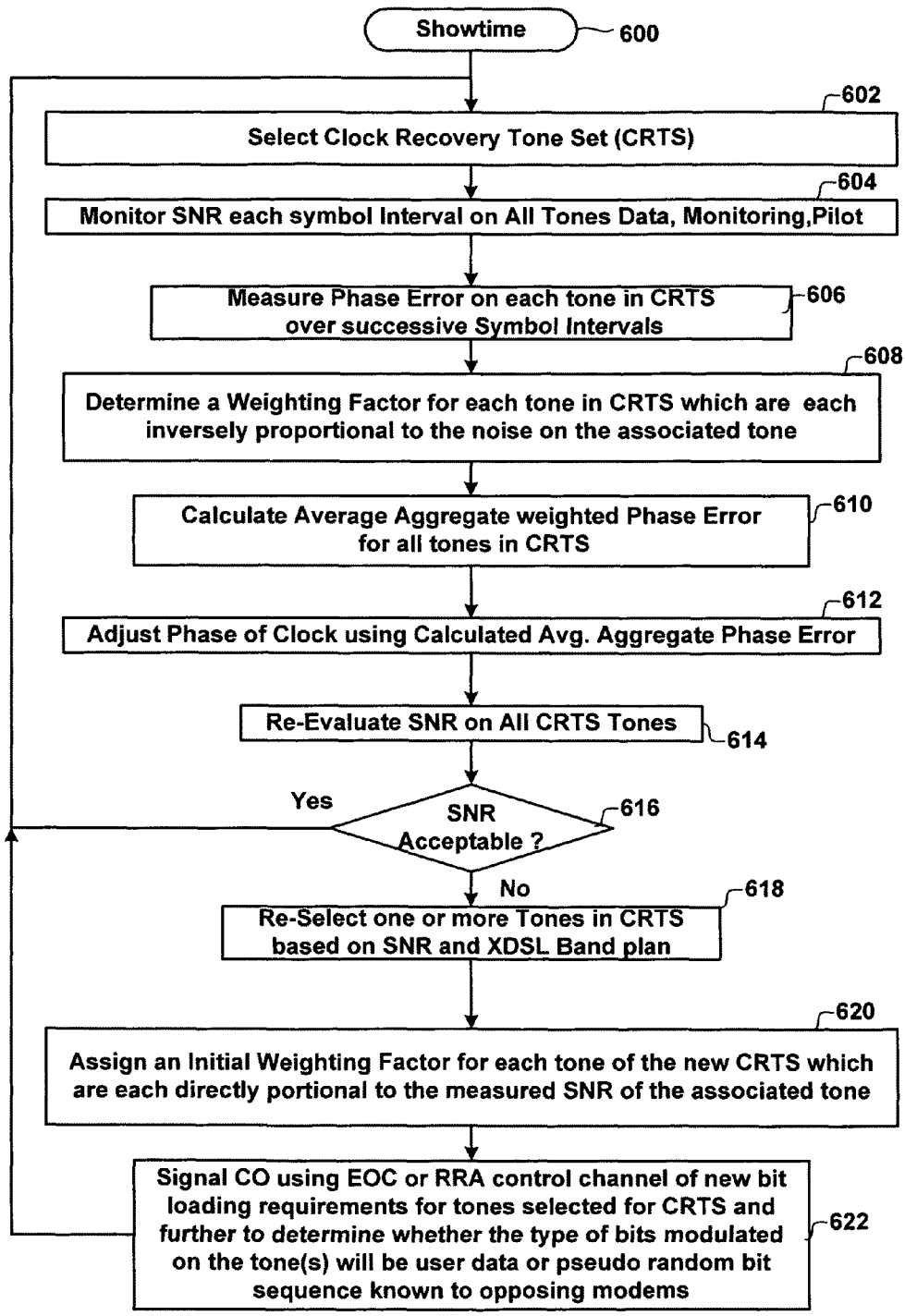
FIG. 6 is a process flow diagram of the phases of transceiver operation associated with clock recovery in accordance with an embodiment of the invention.

FIG. 6 is a process flow diagram of the phases of transceiver operation associated with clock recovery in accordance with an embodiment of the invention. After modem or transceiver initialization is complete, the show time phase of operation commences in process 600. During this phase of operation video, voice and general data communications are conducted between the opposing modems over upstream and downstream channels. Next control passes to process 602 in which the clock recovery tone set (CRTS) is selected from among the set of tones associated with each symbol. Typically, the CRTS tones comprise a small fraction of the total number of modulated tones. The tones are selected based on their elevated signal-to-noise ratio (SNR) and their favorable placement within each of the downstream bands over which the modem receives communications. Next in process 604 SNR data is collected and continuously updated for all tones in each symbol set, e.g. pilot tones, data tones, and monitoring tones. In a typical DSL system this function is accomplished by the slicer sub-component of the decoder and is used for processing the received communication channel.

Next in process 606 the phase error on all of the CRTS tones is measured at the output of the discrete Fourier Transform (DFT) component, continuously over successive symbol intervals. This allows for both the determination of phase error on individual CRTS tones as well as the characterization of the statistical distribution of the phase error for each tone in the CRTS. Then in process 608 the weighting factor for each tone in the CRTS is determined. In an embodiment of the invention the weighting factors are inversely proportional to the phase error or phase noise on the tone as discussed above in connection with Equation 4a. Next in process 610 the average aggregate weighted phase error for all tones in the CRTS is calculated as discussed above in connection with Equation 5. The average aggregate weighted phase error is used in process 612 to adjust the phase of the transceivers master clock or oscillator in a direction which reduces phase error with the clock on the opposing transceiver.

The CRTS is not fixed, in the sense that if burst or static noise on the communication medium renders one of the CRTS tones inoperative, as determined by the SNR levels thereon it is dropped and replaced with a tone which has an elevated SNR level. These functions are achieved in processes 614-618.

In process 614 the SNR of all CRTS tones is re-evaluated. In the following decision process 616 a determination is made as to whether the SNR of any one of the CRTS tones has fallen below an acceptable lower limit or threshold. If not control returns to process 602.

If a determination is made that SNR on one or more CRTS tones is not at an acceptable level, then control passes to process 618. In process 618 the unacceptable tone in the CRTS is dropped and replaced with any one of the remaining tones in the overall tone set which has an elevated SNR and which has an index which in combination with the remaining tones in the CRTS offers good spectral coverage in representative portions of the downstream XDSL band plan, i.e. the portion of the spectrum on which the receive path of the modem demodulates data.

After re-selection of the CRTS tones an initial weighting factor is assigned to each of the new tones. The weighting factor is proportional to the measured SNR for the tone as discussed above in connection with Equation 4c.

Next in process 622 the embedded operations channel (EOC), the rapid rate adaptation channel (RRA), or other control or message channel is used to signal the remote modem, typically at the central office (CO) to effect the proper bit loading on the tones selected for the CRTS. The new bit loading control message for tones selected for CRTS further to determine whether the type of bits modulated on the tone(s) will be user data or pseudo random bit sequence known to opposing modems.

In one embodiment of the invention bit loading on data tones selected for CRTS usage is reduced to a very low level, e.g. 2 bits of user data. In another embodiment of the invention the bit loading message signals the remote modem to convert a data tone to a monitor tone modulated with a pseudo random bit sequence known to both modems.

Whether the CRTS includes data or monitor tones or a mix thereof, control next returns to process 602 for continuous clock recovery and for possible re-selection of tones designated for usage in clock recovery, i.e. the CRTS tones. This ability to constantly adjust clock recovery tones during show time operations enhances both the accuracy of clock recovery and in the extreme the survivability of the communication channel.

The components and processes disclosed herein may be implemented as software, hardware, firmware, or a combination thereof, without departing from the scope of the Claimed invention.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. A multi-tone transceiver with a plurality of components forming a transmit path and a receive path configured to couple via a subscriber line to an opposing multi-tone transceiver for frequency division multiplexed multi-tone modulated communications therewith; and the multi-tone transceiver comprising:

a transform component on the receive path to transform in each successive symbol interval received communications from a time domain to a frequency domain into individual tones or sub-channels;

a tone selector coupled to the transform component to select a sub-set comprising less than all of the individual tones which exhibit an elevated signal-to-noise ratio (SNR) as a clock recovery tone set (CRTS) and to dynamically drop and add tones to the CRTS in successive symbol intervals as required by changes in the SNR of the individual tones, such that a plurality of different CRTS tones are selected in successive symbol intervals during a showtime phase of operation;

an error detector coupled to the tone selector to detect phase errors in each tone of the respective CRTS;

an aggregator coupled to the error detector to calculate an average aggregate phase error from all tones in the respective CRTS;

an oscillator coupled to transmit and receive path components to control clocking thereof and the oscillator responsive to the average aggregate phase error calculated by the aggregator to adjust a clock phase in a direction which reduces a phase error with a clock on the opposing transceiver, thereby maintaining synchronous operation with the opposing multi-tone transceiver by dynamically re-selecting CRTS tones responsive to changes in SNR in successive symbol intervals during a showtime phase of operation.

2. The multi-tone transceiver of claim 1 wherein the tone selector is further configured to select a subset of tones among those tones exhibiting an elevated SNR, which are spaced apart from one another in frequency across a frequency range modulated by the multi-tone transceivers.

3. The multi-tone transceiver of claim 1 wherein the tone selector is further configured to signal the opposing multi-tone transceiver at least one of: a bit loading requirement corresponding with a monitor tone modulated with a pseudo random bit sequence; and a bit loading requirement corresponding with a data tone modulated with 2 bits of data.

4. The multi-tone transceiver of claim 1 wherein the aggregator is further configured to calculate weighting factors and with the weighting factor for each tone in the respective CRTS inversely proportional to noise on the associated tone.

5. The multi-tone transceiver of claim 1 wherein the aggregator is further configured to calculate weighting factors for each tone in the respective CRTS with each weighting factor for a tone with index k having an alpha substantially corresponding to:

$$\alpha_k = \frac{1}{\sigma_{L_k}}$$

where sigma is the statistical variance of the phase error for the tone with index k across successive symbol intervals.

6. The multi-tone transceiver of claim 1 wherein the aggregator is further configured to calculate initial weighting factors and the initial weighting factor for each tone in the respective CRTS directly proportional to the signal to noise ratio (SNR) of the associated tone.

7. The multi-tone transceiver of claim 1 wherein the aggregator is further configured to calculate weighting factors for each tone in the respective CRTS with each weighting factor for a tone with index k having an alpha substantially corresponding to:

$$\alpha_k = \sqrt{SNR_k}$$

where $SNR_k$ is the signal-to-noise ratio for the tone with index k.

8. A method for clock recovery on one of an opposing pair of XDSL transceivers coupled to one another over a subscriber line, and each configured for frequency division multiplexed multi-tone modulated communications over the subscriber line, and the method comprising:

selecting, in a given symbol interval during a showtime phase of operation, a clock recovery tone set (CRTS) comprising selected tones comprising less than all of the tones used in the frequency division multiplexed multi-tone modulated communications which exhibit an elevated signal-to-noise ratio (SNR) and selecting a second different CRTS in a successive symbol interval during the showtime phase of operation;

signaling a bit loading requirement for certain of the tones selected in the act of selecting the CRTS in the given symbol interval to an other of the opposing pair of XDSL transceivers;

calculating an average aggregate phase error for all tones in the respective CRTS;

adjusting a clock phase using the average aggregate phase error calculated in the calculating act, in a direction which reduces a phase error between clocks on the XDSL transceivers;

determining, in the given symbol interval, that the SNR of one or more of the tones in the respective CRTS has fallen below a threshold; and repeating, in a subsequent symbol interval, the selecting, signaling, calculating and adjusting acts responsive to the determination in the determining act, thereby maintaining synchronous operation of the opposing pair of XDSL transceivers by dynamically re-selecting CRTS tones responsive to changes in SNR during a showtime phase of operation.

9. The method of claim 8 wherein the selecting act further comprises:

selecting a subset of tones among those tones exhibiting an elevated SNR, which are spaced apart from one another in frequency across a frequency range modulated by the transceivers.

10. The method of claim 8 wherein the signaling act further comprises at least one of the acts of:

signaling to the other of the opposing pair of XDSL transceivers a bit loading requirement corresponding with a monitor tone modulated with a pseudo random bit sequence; and signaling to the other of the opposing pair of XDSL transceivers a bit loading requirement corresponding with a data tone modulated with 2 bits of data.

11. The method of claim 8 wherein the calculating act further comprises:

calculating weighting factors for the tones with the weighting factor for each tone in the respective CRTS inversely proportional to noise on the associated tone.

12. The method of claim 8 wherein the calculating act further comprises:

calculating weighting factors for each tone in the respective CRTS with each weighting factor for a tone with index k having an alpha substantially corresponding to:

$$\alpha_k = \frac{1}{\sigma_{L_k}}$$

where sigma is the statistical variance of the phase error for the tone with index k across successive symbol intervals.

13. The method of claim 8 wherein the calculating act further comprises:
calculating initial weighting factors for the tones with the initial weighting factor for each tone in the respective CRTS directly proportional to the signal to noise ratio (SNR) of the associated tone.

14. The method of claim 8 wherein the calculating act further comprises:
calculating initial weighting factors for each tone in the respective CRTS with each initial weighting factor for a tone with index k having an alpha substantially corresponding to:

$$\alpha_k = \sqrt{SNR_k}$$

where $SNR_k$ is the signal-to-noise ratio for the tone with index k.

15. A means for clock recovery on one of an opposing pair of XDSL transceivers coupled to one another over a subscriber line, and each configured for frequency division multiplexed multi-tone modulated communications over the subscriber line, and the means comprising:
means for selecting, in a given symbol interval during a showtime phase of operation, a first clock recovery tone set (CRTS) comprising selected tones comprising less than all of the tones used in the frequency division multiplexed multi-tone modulated communications which exhibit an elevated signal-to-noise ratio (SNR) and for selecting a second different CRTS in a successive symbol interval during the showtime phase of operation;
means for signaling a bit loading requirement for certain of the tones selected by the selecting means to an other of the opposing pair of XDSL transceivers;
means for calculating an average aggregate phase error for all tones in the respective CRTS;
means for adjusting a clock phase using the average aggregate phase error calculated by the calculating means, in a direction which reduces a phase error between clocks on the XDSL transceivers; and
means for determining, in the given symbol interval, that the SNR of one or more of the tones in the respective CRTS has fallen below a threshold,
thereby maintaining synchronous operation of the opposing pair of XDSL transceivers by dynamically re-selecting CRTS tones responsive to changes in SNR in successive symbol intervals during a showtime phase of operation.

16. The means for clock recovery of claim 15 wherein the selecting means further comprises:
means for selecting a subset of tones among those tones exhibiting an elevated SNR, which are spaced apart from one another in frequency across a frequency range modulated by the transceivers.

17. The means for clock recovery of claim 15 wherein the signaling means further comprising at least one of:
means for signaling to the other of the opposing pair of XDSL transceivers a bit loading requirement corresponding with a monitor tone modulated with a pseudo random bit sequence; and
means for signaling to the other of the opposing pair of XDSL transceivers a bit loading requirement corresponding with a data tone modulated with 2 bits of data.

18. The means for clock recovery of claim 15 wherein the calculating means further comprises:
means for calculating weighting factors, for the tones with the weighting factor for each tone in the CRTS inversely proportional to noise on the associated tone.

19. The means for clock recovery of claim 15 wherein the calculating means further comprises:
means for calculating weighting factors for each tone in the CRTS with each weighting factor for a tone with index k having an alpha substantially corresponding to:

$$\alpha_k = \frac{1}{\sigma_{L_k}}$$

where sigma is the statistical variance of the phase error for the tone with index k across successive symbol intervals.

20. The means for clock recovery of claim 15 wherein the calculating means further comprises:
means for calculating initial weighting factors for the tones with the initial weighting factor for each tone in the CRTS directly proportional to the signal to noise ratio (SNR) of the associated tone.

21. The means for clock recovery of claim 15 wherein the calculating means further comprises:
means for calculating initial weighting factors for each tone in the CRTS with each initial weighting factor for a tone with index k having an alpha substantially corresponding to:

$$\alpha_k = \sqrt{SNR_k}$$

where $SNR_k$ is the signal-to-noise ratio for the tone with index k.

* * * * *